Patented Mar. 6, 1923.

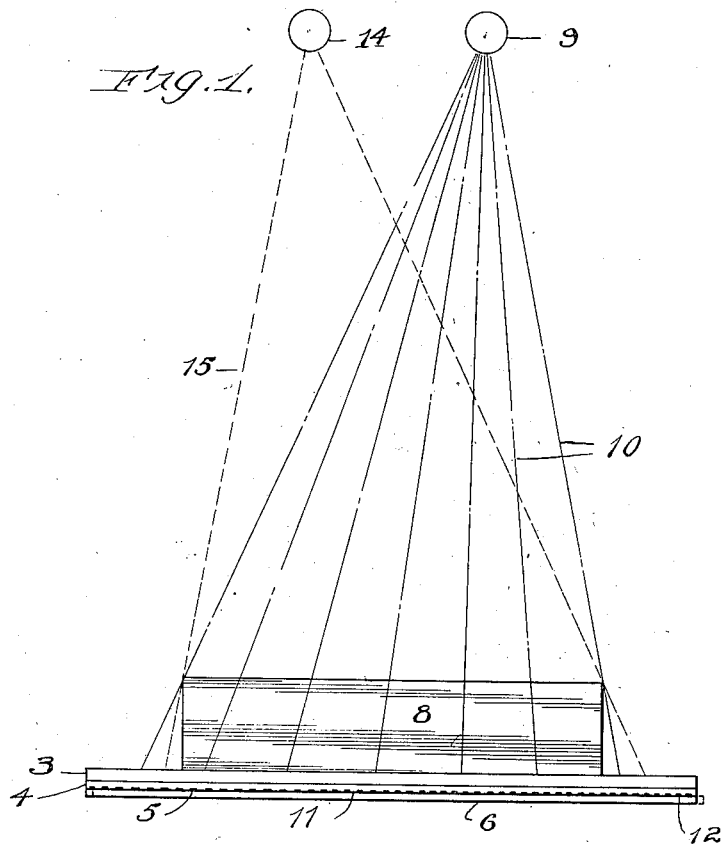
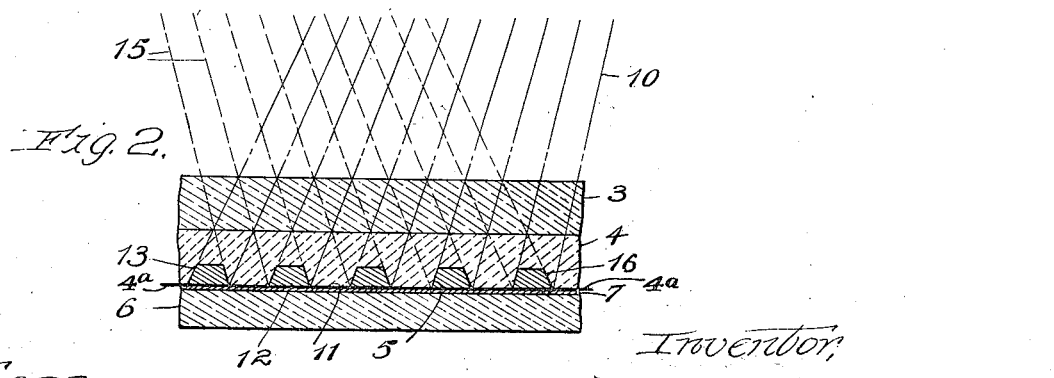

1,447,430

UNITED STATES PATENT OFFICE.

GEORGE W. RICHARDSON, OF CHICAGO, ILLINOIS, ASSIGNOR TO LOUIS W. PEASE, OF CHICAGO, ILLINOIS.

SCREEN FOR X-RAY PHOTOGRAPHY.

Application filed February 27, 1919. Serial No. 279,535.

*To all whom it may concern:*

Be it known that I, GEORGE W. RICHARDSON, a citizen of the United States, residing at Chicago, in the county of Cook and State of Illinois, have invented certain new and useful Improvements in Screens for X-Ray Photography, of which the following is a specification.

I have discovered that screens may be used in connection with X-ray photography for securing certain desired results, and no photographic screens such as ordinarily made are adapted for such purposes, as such screens will not obstruct or cut out the X-rays.

On account of the nature of the materials which must be used for obstructing X-rays, it is difficult to construct a screen which is adapted for use in connection with X-ray photography. The present invention relates to a screen whereby certain of the X-rays will be obstructed and other of the rays permitted to pass through the screen, whereby the desired results may be obtained in this type of photography.

The objects of this invention are, to provide a screen having portions which are opaque to the X-rays and other portions which are transparent; to provide a screen of this character in which the opaque portions will effectively stop the X-rays and will produce sharp images on the negative; to provide a screen having exceedingly fine parallel grooves filled with material which will obstruct or stop the X-rays; and, in general, to provide such an improved screen and method of making the same as will be described more fully in the following specification.

In the accompanying drawings illustrating this invention:

Figure 1 is a diagrammatic view illustrating one method of taking photographic prints by means of such screens; and Figure 2 is an enlarged cross sectional view, showing the screen in position on a photographic plate or negative.

The principal use of screens of this character is to permit different exposures to be made on the same plate and covering substantially the same area, the first exposure being made and then the screen shifted so that the unexposed portions of the plate will be presented at the time the second exposure is made. Photographs or pictures made in this way have certain advantages, particularly in connection with surgical work. For instance, if the exposures are taken at different angles, the object to be photographed would be shown from different sides or from different positions in the single plate. This has the effect of producing pictures having certain stereoscopic characteristics, and the stereoscopic effect is accentuated in some instances by the use of viewing screens.

As illustrated in the drawings, 3 represents a plate, preferably of glass, to which is firmly cemented or secured a plate 4 of celluloid or the like. Grooves 5 are cut or otherwise formed in the celluloid plate, for receiving the material which is opaque or impervious to the X-rays. In actual practice, I have cut these grooves in the plate 4, such grooves being approximately .016 of an inch in depth and also .016 of an inch in width at the surface of the plate, and the spaces between the grooves at the surface are equal to the width of such grooves.

When this screen is used in making an exposure, it is placed, as shown in Fig. 2, on the photographic plate or negative 6, so that the surface of the screen is in contact with the sensitized film 7 of the plate. As illustrating the manner in which the photograph is taken, it may be assumed that the screen is in the position shown in Fig. 1, with the object 8, which is to be photographed, in position above the screen. The first exposure is made with the X-ray tube 9 at some distance above the screen and at the right of the center thereof.

It will be seen that the rays 10 pass through the plate 4, and some of these rays go through the intermediate spaces 11 between the grooves 5 and act directly on the photographic plate. The remainder of the rays which strike the opaque fillings 12 in the grooves 5 are intercepted and prevented from acting on the sensitized plate.

It will be noted that if these grooves were rectangular in cross section and the rays struck the screen at an angle thereto, there would be a tendency toward the screen bars farthest from the tube to cut off more rays of light than those directly underneath the tube, and consequently the exposed strips would vary in width. In order to overcome such objection, and in order to provide for sharp contact and images, I bevel the edges of the grooves 5 as indicated in Fig. 2. It will be seen that the outer surface 13 of the last groove to the left is beveled or tapered so as to coincide with the angle of the ray 10 from the tube 9, so that the total width of the rays which are intercepted is exactly equal to the width of the base or lower surface of the groove 5. All of the grooves may have the same taper, or at least should be beveled a sufficient amount so as to produce this effect.

After the exposure has been made with the tube shown at the right as in Fig. 1, the tube is then moved to the left as indicated at 14, and the plate 6 is moved laterally relative to the screen 4 a distance equal to the spaces between the screen bars 12, and the next exposure is then made. It will now be seen that the rays as indicated by the dotted lines 15 are at a different angle to the plate 4, and the opposite sides 16 of the grooves 5 are tapered or beveled in the manner above described, so that sharp images will be produced when the second exposure is made.

It will be noted that the sides of the grooves may be tapered or beveled a sufficient amount to accommodate the rays from the tube in all of its working positions, or different screens may be utilized, having different tapers to the sides of the screen bars, such taper being in proportion to the height of the tube above the screen and also in accordance with the width of the screen. It will readily be seen that by means of this arrangement, when each exposure is made the intercepted rays will be sharply cut off from the active rays, so that the parallel exposed surfaces will be clearly defined and the spaces will all be identically the same width, in accordance with the predetermined dimensions of the screen.

Lead is well recognized as being one of the best, if not the best material, for intercepting the X-rays or Roentgen rays, but it will be observed that it would be exceedingly difficult to insert lead in such minute grooves. If the grooved plate is made of metal, it is exceedingly difficult, if not impossible, to fill the grooves by pouring molten lead therein. In order to overcome these difficulties, I fill the grooves with an amalgam or composition formed of lead and mercury, or preferably of lead, mercury and cadmium, the latter serving to harden the composition. These metals may be used in the proportion of twelve parts of lead to one part of mercury and one part of cadmium, or the composition may be varied as may be desired for different conditions.

This amalgam is spread into the grooves, and the surface of the plate is then cleaned or polished and a coating $4^a$ of transparent celluloid is preferably spread over the surface so as to protect the bars or fillings and made a smooth surface. Instead of a relatively thin sheet 4 of celluloid such as shown in the drawings, a thicker sheet or plate may be used without the necessity of a backing or supporting plate. It will also be observed that the grooves may be cut or otherwise formed in any suitable material which will permit the passage of the X-rays, such, for instance, as aluminum or the like. It will also be noted that other opaque filling material or materials may be used for forming the non-transparent bars without departing from the scope of this invention. Therefore, I do not wish to be limited to the exact materials or processes herein shown and described, except as specified in the following claims:

1. A screen for X-ray photography, comprising a plate formed of material which will transmit the rays, said plate having grooves with converging sides in the face thereof, the grooves being arranged so that the spaces between them are equal to the widths of the grooves at the surface of the plate, said grooves being filled with material which is non-transparent to X-rays or the like.

2. A screen, comprising a plate having parallel longitudinal bars arranged in one side thereof, said bars being of material which will intercept X-rays or the like, the sides of said bars being beveled in accordance with the direction of X-rays, from a plurality of source positions, whereby the width of the bundle of rays intercepted by any bar will not be greater than the width of the bar at the surface of the plate.

3. A screen, comprising a plate of glass, a sheet of celluloid secured to said plate and having longitudinal grooves in the opposite surface thereof, said grooves being of uniform width and spaced so that the distances between them will be equal to the width of the grooves, opaque material in said grooves, and a covering of celluloid over said grooved surface and filling material.

4. A photographic screen having opaque bars, with beveled sides proportioned to the direction of X-rays, from a plurality of source positions, whereby the width of the strip of rays intercepted by each bar will not exceed the width of the bar at the contact surface.

5. The method of manufacturing screens for X-ray photography, which consists in forming grooves in a suitable plate, then filling said grooves with amalgam, and finally covering the surface with celluloid.

GEORGE W. RICHARDSON.